(12) United States Patent
Mosur et al.

(10) Patent No.: US 7,533,286 B2
(45) Date of Patent: May 12, 2009

(54) REGULATING APPLICATION OF CLOCK TO CONTROL CURRENT RUSH (DI/DT)

(75) Inventors: Praveen Mosur, Shrewsbury, MA (US); Duane E. Galbi, Cambridge, MA (US); Benjamin J. Cahill, Oxford, MA (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 11/169,429

(22) Filed: Jun. 29, 2005

(65) Prior Publication Data

US 2007/0006012 A1    Jan. 4, 2007

(51) Int. Cl.
G06F 1/04      (2006.01)
G06F 1/12      (2006.01)
G06F 5/06      (2006.01)

(52) U.S. Cl. ...................................... 713/600
(58) Field of Classification Search ................. 713/600
See application file for complete search history.

(56) References Cited

U.S. PATENT DOCUMENTS

| 5,497,497 | A * | 3/1996 | Miller et al. | 713/1 |
| 2003/0093702 | A1* | 5/2003 | Luo et al. | 713/320 |
| 2003/0174727 | A1* | 9/2003 | Chu et al. | 370/465 |
| 2003/0182613 | A1* | 9/2003 | Chu | 714/758 |
| 2004/0025070 | A1* | 2/2004 | Yuan | 713/330 |
| 2004/0083400 | A1* | 4/2004 | Saito et al. | 713/500 |
| 2004/0151149 | A1* | 8/2004 | Song et al. | 370/338 |

* cited by examiner

*Primary Examiner*—Thomas Lee
*Assistant Examiner*—Mohammed H Rehman
(74) *Attorney, Agent, or Firm*—Ryder IP Law; Douglas J. Ryder

(57) ABSTRACT

In general, in one aspect, the disclosure describes an apparatus for engineering di/dt. The apparatus includes a plurality of functional blocks to perform different functions. The apparatus also includes a clock source to provide a clock signal to said plurality of functional blocks. At least one gating device is used to regulate application of the clock to the plurality of functional blocks. A controller is included to control the at least one gating device and turning-on of the clock signal.

19 Claims, 4 Drawing Sheets

REGULATING APPLICATION OF CLOCK TO CONTROL CURRENT RUSH (DI/DT)

BACKGROUND

Very Large Scale Integration (VLSI) chips, such as network processors, may utilize a clock or clocks to operate the function or functions that the chip performs. The clock(s) may be generated from a phase lock loop (PLL) circuit or PLL circuits. During start-up or reset of the chip, there will be a period in which the PLL is attaining lock on a frequency (PLL lock period). In order to reduce contention and to initialize sequential elements during start-up, VLSI chips may utilize a slow speed bypass clock (provide to the chip by either a low speed ring oscillator or an externally generated clock) while external reset is asserted. After the de-assertion of reset, the PLL starts the process of locking to the specified frequency. While the PLL is in the process of attaining lock on the frequency, the clocks to the functional blocks may be disabled.

Once the PLL is locked, the clock or clocks can be generated from the PLL and applied to various functional blocks on the chip (the clocks to the functional blocks are enabled after the PLL has locked). Depending upon the frequency and the total capacitive load that the clock is driving, the sudden turn-on of the clocks after the PLL has locked may cause a large current rush (di/dt). A di/dt can result in localized and global voltage droops. The magnitude of this droop may depend on varying parameters including the power delivery, amount of on-die and off-chip de-coupling capacitance, and frequency response of the power supply. It is possible that the voltage droop caused by a large di/dt event may cause the PLL to lose lock, state elements on the chip to lose their reset value, or other errors or degradations of the chips performance.

BRIEF DESCRIPTION OF THE DRAWINGS

The features and advantages of the various embodiments will become apparent from the following detailed description in which.

DETAILED DESCRIPTION

Figure 1:
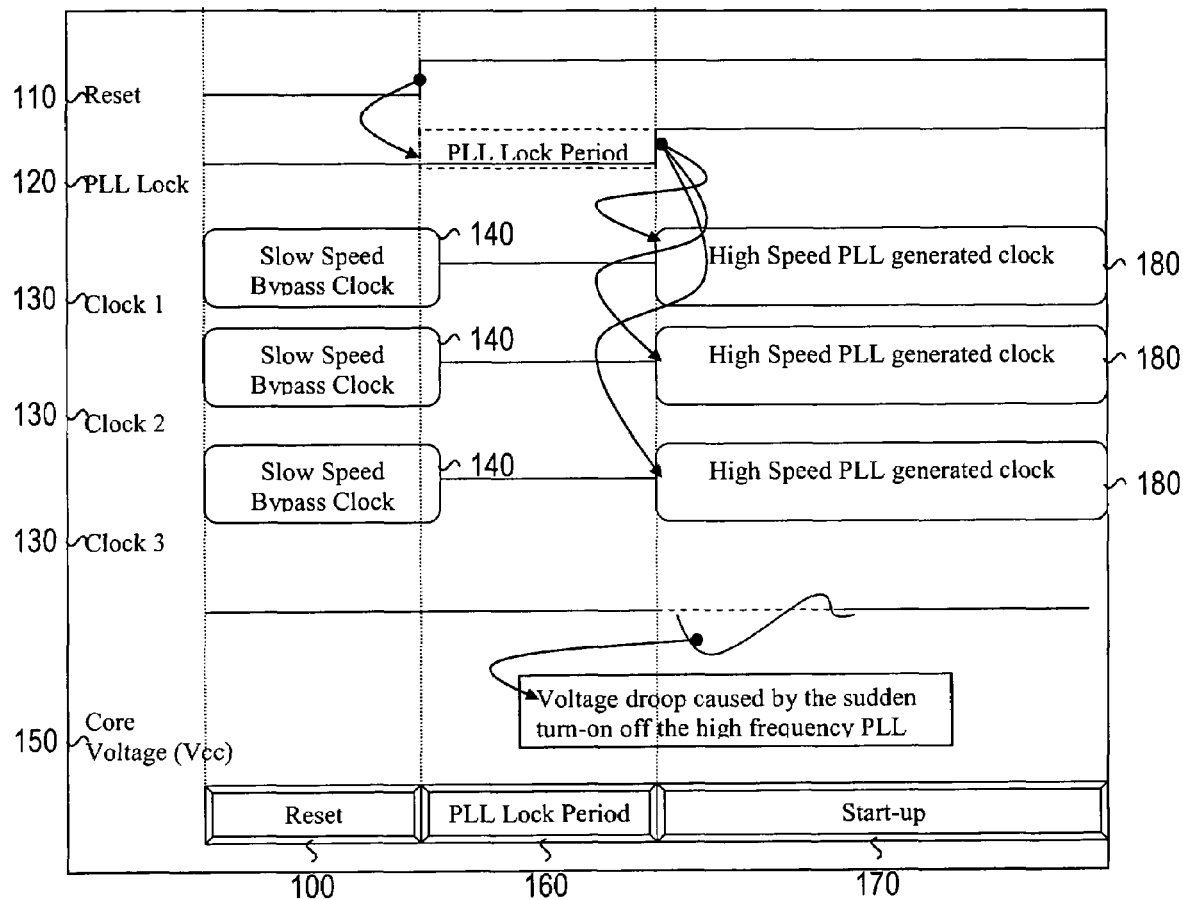
FIG. 1 illustrates a phase diagram for a chip showing example effects on core voltage of multiple activations of high frequency PLL generated clocks, according to one embodiment.

FIG. 1 illustrates a phase diagram for a chip showing example effects on core voltage of multiple activations of high frequency PLL generated clocks. During a reset phase 100, a reset bit 110 is activated (e.g., set low), the PLL lock 120 is not locked (e.g., set low) and the clocks 130 use a slow speed bypass clock 140 instead of a high speed PLL generated clock. The core voltage 150 of the chip is maintained. Upon completion of the reset phase 110, the chip enters a PLL lock phase 160. During this time, the reset 110 is deactivated (e.g., set high), the clocks 130 are turned off, and the core voltage 150 is maintained. During the PLL lock phase 160, the PLL lock 120 will begin to attain and lock on a specified frequency. Once the PLL locks, the chip begins a start-up phase 170. During the start-up phase 170, the clocks 130 provide a high speed PLL generated clock 180. The activation/application of the high speed PLL generated clocks 180 to multiple functions at or near the same time may cause a significant current rush (di/dt). The di/dt may cause the core voltage 150 to droop 190.

The embodiment illustrated in FIG. 1 began with a reset stage 100 in which the clocks 130 utilize a slow speed bypass clock. The reset stage 100 need not be limited thereby. The reset may be externally generated. The external reset is generated by human interaction or may be generated by the system, or one or more components within the system with which the chip is operating. The reset may be internally generated based on the operation of the chip. The initial stage also need not be limited to a reset stage. According to one embodiment, the initial stage may be a sleep mode where the processor turns off non-essential activity. Once the chip came out of sleep mode it may proceed to the PLL lock 160 and start-up phases 170. During start-up of the chip the chip may skip the initial phase and proceed directly to the PLL lock phase 160.

In order to handle the large increase in current that may accompany the application of the high speed PLL generated clock to multiple functions upon start-up 170, a power supply needs to be provided that can handle the large spikes in current as well as the load of the chip. Power supplies that can handle such rapid increases in current are more complicated and expensive. Furthermore, the chip may require use of a significant number of I/O pins on the package to feed power to the chip. Using a large amount of pins either increases the size of the package or reduces the number of pins available for other functions. Moreover, the exact amount of current rush caused by the application of the high speed PLL generated clock to multiple functions upon start-up is not known until completion of the design of the chip.

According to one embodiment, rather than design a power supply and a chip package with sufficient power I/O pins to handle the di/dt, the frequency of the high-speed clock signals may be slowly stepped up so as to slow the increase in current and reduce the di/dt. Slowly stepping up the frequency of the clocks requires circuitry that takes up die space. Furthermore, if multiple clocks are utilized that have interrelated frequencies that are aligned, the circuitry necessary to slowly step up the various clock frequencies while maintaining the frequency alignment becomes more complicated.

According to one embodiment, the large di/dt during the sudden turn-on of the clocks after the PLL has locked may be controlled by delaying the application of the clock to non start-up functions. That is, the clock would first be applied to the functions that were required for start-up and then would be applied to other functions. The start-up functions are those functions that were required for booting and initialization of the chip. The delaying of the application of the clock to some of the functions would spread the increase in current and reduce the di/dt.

Figure 2:
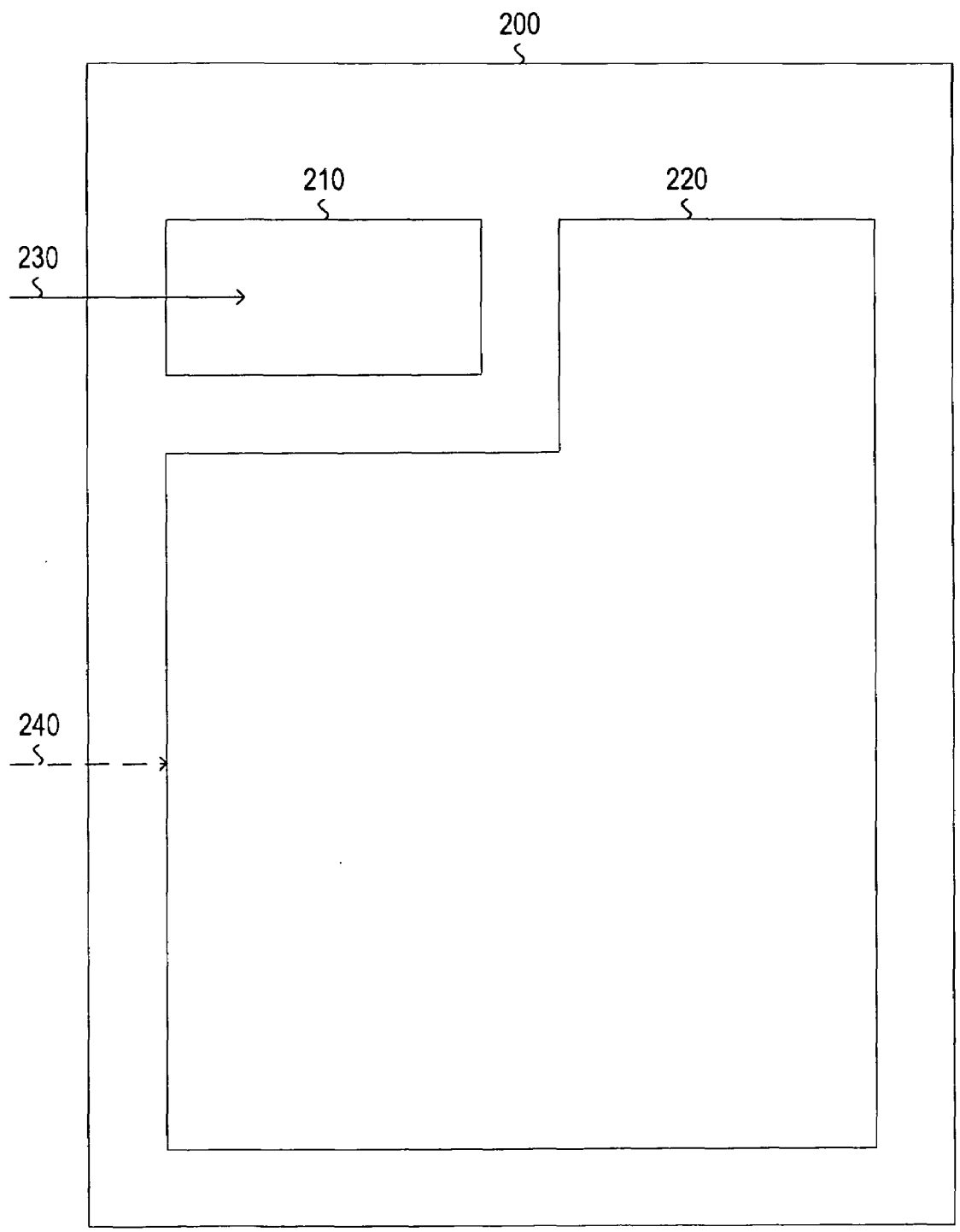
FIG. 2 illustrates an example of a chip having start-up and non start-up functions, according to one embodiment.

FIG. 2 illustrates an example of a chip 200 having start-up 210 and non start-up functions 220. Non start-up functions 220 may include caches, execution engines, cryptography engines and other specialized functions. Once the PLL has locked, a high-speed clock generated therefrom 230 may be applied to the start-up functions 210. After some period of delay the clock (delayed clock) 240 could proceed to be applied to the other functions 220. The delaying of the clock to one or more functions can be done by gating the clock being provided to those functions. The gating function may require additional components to be included on the die. However, the delay of the clock application may reduce di/dt to save power and accordingly save I/O pins and other die real estate that may be required to handle the additional di/dt.

Figure 3:
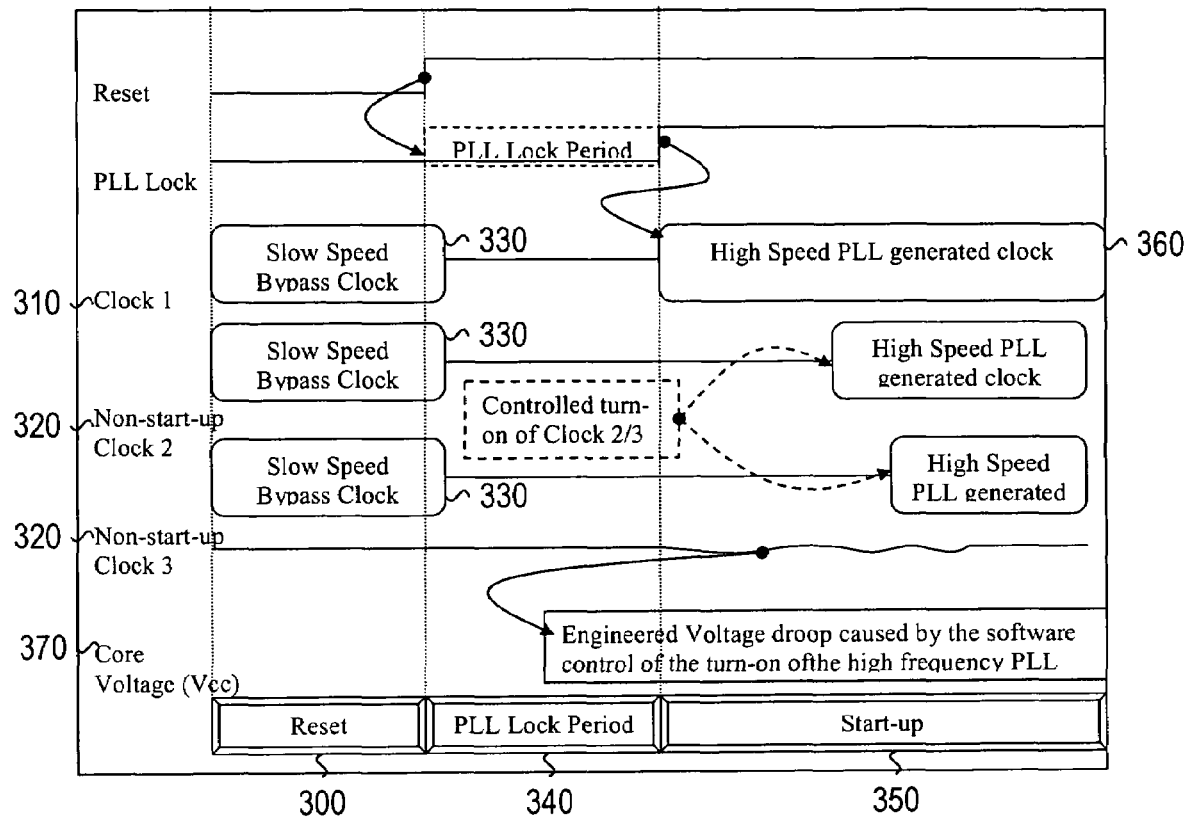
FIG. 3 illustrates a phase diagram for a chip showing a delay in the application of clocks not required for start-up and reduced example effects on core voltage, according to one embodiment.

FIG. 3 illustrates a phase diagram for a chip showing a delay in the application of clocks not required for start-up and reduced example effects on core voltage. During a reset phase 300, start-up clock (clock 1) 310 as well as non start-up clocks (clocks 2 and 3) 320 use a slow speed bypass clock 330. During a PLL lock phase 340, the PLL locks on a specified frequency and the clocks 310, 320 are turned off. During a start-up phase 350, the start-up functions connected to clock (clock 1) 310 receive a high-speed PLL generated clock 360. Functions connected to non start-up clocks (clocks 2 and 3) 320 have application of the high-speed PLL generated clock 360 delayed. As illustrated, clock 2 320 is delayed a first amount and clock 3 320 is delayed a second amount. Accordingly, the application of the high-speed PLL generated clock 360 to the functions on the chip is spread over a time period so that the di/dt is decreased. The application of the clocks over time reduces the di/dt and the effect on core voltage 370.

The delay in the application of the clock to non start-up functions could be based on numerous factors including a predefined time limit, predefined number of cycles of the clock to the start-up functions, or after the start-up functions performed a certain activity. The gate may operate based on bits that either enable or disable the application of the clock. For example, one of the bits may be an indication as to the operational phase of the chip. If the chip is in a start-up phase it will be set meaning that gating of the clock to certain functions is enabled. Other bits may be bits that are associated with the specific functions being delayed and how long the delay is. For example, if a certain function is to be delayed a delay bit may be set that enables the delay. If the delay to the function is based on a predetermined amount of time another bit may be associated with the time. Before the time has expired the bit will be set thus activating the gate and blocking application of the clock but after the predefined time the bit may be deactivated thus deactivating the gate and allowing the clock to be applied to the function.

The placement of the gates and the control lines that are applied to the gates may be part of the manufacture of the chip. For example, during production of the chip, gates and control lines may be provided to non-start-up functions. The application or initialization of the control lines to various gates may be programmed when the chip is manufactured (in advance). The chip may be programmed during manufacture to gate certain functions for a first time period and other functions for a second time period so that the application of the high-speed PLL generated clock to the functions on the chip take place in three phases (a start-up phase, a first delay phase, and a second delay phase).

Alternatively, the application/initialization of the delay to certain functions may be controlled by a user of the chip. The user of the chip may program the specific functions to be delayed and what the delay parameters are. The delay parameters may be specific parameters (e.g., 3 microseconds) or may be a range of parameters (e.g., between 2-6 microseconds) associated with a function or group of functions (e.g., functions 1-3 have delay 1 and functions 4-7 have delay 2). The user may modify the parameters as necessary to attain a di/dt that will not degrade the operation of the chip by causing a droop in the core voltage while maintaining correct operation of the chip. For example, a user may initially assign certain delay parameters and then after operating the device may modify the parameters (e.g., increase delay, increase number of functions delayed).

Programmable chips (e.g., network processors) are designed to perform certain functions but can be programmed by an end user based on how the system is configured and how the chip is to operate within the system. For example, end users may program the type of data that is going to be processed by the system, the various inputs that will be received and outputs that will be sent, and quality of service associated with the data and/or inputs/outputs. The timing delay of the application of the clock upon start-up may be just another parameter that is defined by the user. The delay parameter may be assigned based on the use of the chip. This enables the chip to be catered to the different board and power supply characteristics that it may be exposed to.

The user may set and/or modify the parameters utilizing standard tools that are used to program chips. The tools used to program the chip may modify parameters in embedded software that controls the function of the chip. Alternatively, the tools may be used to program values into hardware (e.g., gates).

According to one embodiment, the delay may be controlled at least in part by an embedded management/operation function on the chip. The embedded management function may select or adjust parameters that were programmed in during production or by the end user.

For example, if a range of delays was programmed to control the delay for a certain function or group of functions the embedded management function may select the appropriate value within the selected range. The embedded management function may refine the parameters it assigns during the operation of the chip. For example, a first time that the chip performs a start-up (e.g., an initial power up, reset, activation from sleep-mode) one delay parameter may be selected while a second time a start-up is performed a second delay may be assigned based on the performance or parameters (e.g., process, voltage, temperature) of the chip.

The delay of the clock may be controlled by software embedded on the chip. The delay is not limited to being implemented in software. Rather, the delay may be controlled by firmware, hardware, or some combination of software, firmware and hardware. The delay may be controlled by numerous parameters including timers tracking time, counters tracking cycles, and monitors tracking certain activities. The parameters may be modified by a user or may be modified by the chip (e.g., embedded software on the chip).

The clock gating structure can take advantage of the physical layout of the chip (e.g., the layout of the functional blocks and the clock spine). The gating of the clock can be performed without regard to any functional limitations. For example, functional blocks that are not functionally connected or associated with each other can be gated together (the clock can be delayed to each together) based on their location.

Figure 4:
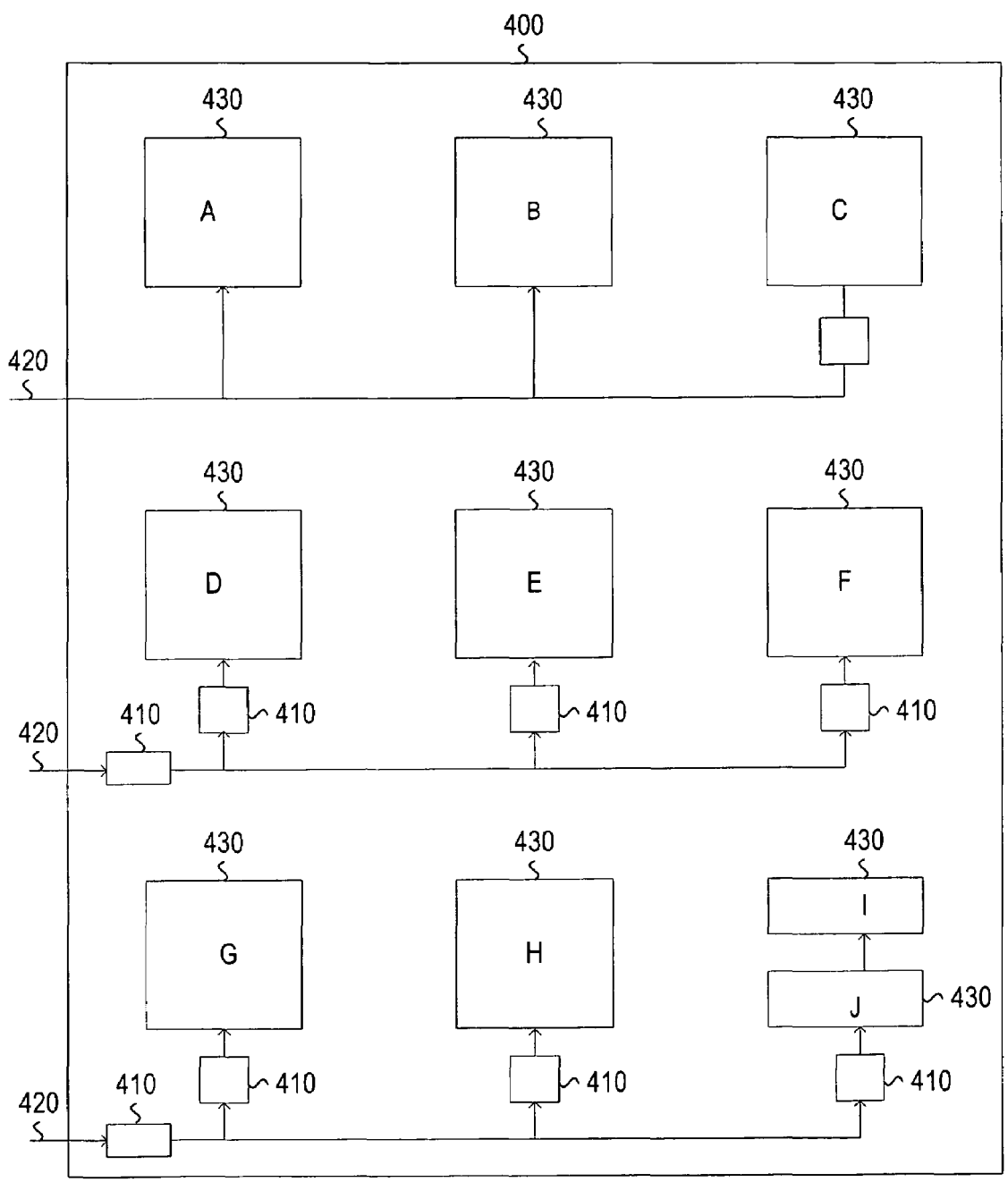
FIG. 4 illustrates an example of a chip utilizing gates to control application of the clock to different functions, according to one embodiment.

FIG. 4 illustrates an example of a chip 400 utilizing gates to control application of the clock to different functions. The chip 400 includes a plurality of gates 410 that are used to control the application of the clock being provided by a clock spine 420 to a plurality of functions 430. As illustrated there are three clock spines 420 (labeled 1-3) that provide the clock to the functions 430 (labeled A-J). The first clock spine feeds functions 430 (A-B) on the start-up path so the entire line is not gated. However, function C on the first clock spine 420 is not part of the start-up/initialization sequence so that function is gated. Clock spine 2 has no functions on the initialization path so that the entire clock spine may be gated as well as the clock being provided to individual functions on the spine. This enables the user to delay the clock to all functions on the spine, to delay just specific functions, or to delay different functions by different amounts. Clock spine 3 is gated in whole and for each of the functions individually or together (I and J).

The various embodiments have been described with respect to a single PLL generated clock. However, the various embodiments could be applied to multiple different clocks whether the clocks were internally generated by a PLL or other means or whether the clocks were externally provided. If in the design of the chip, gates are provided that can be programmed to gate the application of different clocks to different components for certain periods of time during start-up or initialization so as to decrease the di/dt and adverse effects on the core voltage and/or operation of the chip.

The embodiments described above with regard to gating the clock in order to control the di/dt curve can be applied to signals other than the clock without departing from the intended scope. The embodiments described above can be used on both programmable and non-programmable integrated circuits. The integrated circuits utilizing the various embodiments may be used in different systems and in multiple environments. For example, the various embodiments described herein could be part of a computer or could be part of high-speed telecommunications equipment (e.g., store-and-forward devices). If an integrated circuit utilizing the various embodiments discussed herewithin was part of a computer the integrated circuit may contain memory on the die, separate off die memory may be included, or memory may be provided both on and off die. If an integrated circuit utilizing the various embodiments discussed herewithin was part of a store-and-forward device the integrated circuit may be located on a telecommunications board contained therewithin. The telecommunications boards may be Ethernet (e.g., Gigabit, 10 Base T), ATM, Fibre channel, Synchronous Optical Network (SONET), and Synchronous Digital Hierarchy (SDH), amongst others.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily referring to the same embodiment.

Different implementations may feature different combinations of hardware, firmware, and/or software. It may be possible to implement, for example, some or all components of various embodiments in software and/or firmware as well as hardware, as known in the art. Embodiments may be implemented in numerous types of hardware, software and firmware known in the art, for example, integrated circuits, including ASICs and other types known in the art, printed circuit broads, components, etc.

The various embodiments are intended to be protected broadly within the spirit and scope of the appended claims.

What is claimed:

1. An apparatus for engineering di/dt, the apparatus comprising:
   a plurality of functional blocks, wherein a first portion of the plurality of functional blocks are to perform initialization functions for the apparatus and a second portion of the plurality of functional blocks are to perform non-initialization functions;
   a clock source to provide a clock signal to said plurality of functional blocks;
   at least one gating device to delay application of the clock to at least some subset of the second portion of said plurality of functional blocks during initialization; and
   a controller to control said at least one gating device and turning-on of the clock signal.

2. The apparatus of claim 1, further comprising a clock spine to provide the clock from the clock source to the plurality of functional blocks.

3. The apparatus of claim 2, wherein said at least one gating device is located on the clock spine between said clock source and the at least some subset of the second portion of said plurality of functional blocks.

4. The apparatus of claim 1, wherein said controller is a register.

5. The apparatus of claim 1, wherein said controller is programmable by a user.

6. The apparatus of claim 1, wherein said at least one gating device is controllable by a timer or counter.

7. The apparatus of claim 1, wherein said at least one gating device is controllable by software.

8. The apparatus of claim 1, wherein said clock source is a phase lock loop (PLL).

9. The apparatus of claim 1, wherein said clock source is an external clock source.

10. The apparatus of claim 1, wherein said clock source generates multiple clock signals.

11. The apparatus of claim 1, wherein the apparatus is an integrated circuit.

12. The apparatus of claim 11, wherein the integrated circuit is programmable.

13. A computer program embodied on a computer readable storage medium, wherein when the computer program is activated it performs the following functions:
   receiving user input regarding gating application of a clock signal to certain non-initialization functional blocks during initialization;
   assigning activation parameters to gating devices based on the user inputs;
   activating the gating devices during initialization delay application of the clock signal to the certain non-initialization functional blocks;
   tracking the assigned activation parameters; and deactivating the gating devices when the activation parameters are met so that the clock signal is applied to the certain non-initialization functional blocks.

14. The computer program of claim 13, wherein the computer program also tracks operational parameters and modifies the activation parameters based thereon.

15. The computer program of claim 13, wherein the activation parameters include at least some subset of time, counts, and events.

16. A computer comprising:
   a microprocessor die including a:
      a plurality of functional blocks, wherein a first portion of the plurality of functional blocks are to perform initialization functions and a second portion of the plurality of functional blocks are to perform non-initialization functions
      a clock source to provide a clock signal to the plurality of functional blocks;
      at least one gating device to delay application of the clock to at least some subset of the second portion of the plurality of functional blocks during initialization; and
      a controller to control the at least one gating device and turning-on of the clock signal so as to enable engineering of di/dt; and
   an off die memory device.

17. The computer of claim 16, wherein the controller is a register.

18. The computer of claim 16, wherein the controller is programmable by a user.

19. The computer of claim 16, wherein the at least one gating device is controllable by software.

* * * * *